UNITED STATES PATENT OFFICE.

J. C. BELL, OF PAWNEE CITY, NEBRASKA.

IMPROVED METHOD OF TREATING SUGAR-CANE.

Specification forming part of Letters Patent No. 57,465, dated August 28, 1866.

*To all whom it may concern:*

Be it known that I, J. C. BELL, of Pawnee City, Nebraska, have invented a new and useful Improvement in Treating Sugar-Cane; and I do hereby declare that the following is a full, clear, and exact description thereof, which will enable others skilled in the art to fully understand and make use of the same.

This invention relates to a new and improved process of treating sugar-cane, particularly sorghum, previous to exposing the same to the action of the grinding-rollers, in such a manner that the vegetable and acrid matters contained in the cane are set or washed out and prevented from getting mixed with the juice, and a sirup is obtained of superior quality and not liable to sour.

My process is carried out as follows: Previous to grinding, I take the cane and put it into an ordinary evaporating-pan, together with a quantity of water sufficient to cover the cane, and then I cover up the pan with boards to prevent the free escape of steam, and heat the whole for about an hour to the boiling-temperature. By the action of the hot water and steam the vegetable and acrid matters contained in the cane are partially set and partially washed out, and when the cane is taken from the bath and exposed to the action of the grinding-rollers a pure juice is obtained, which is readily boiled down to the desired consistency, and which yields a larger percentage of sugar than juice expressed in the ordinary manner.

It is obvious that my steaming process can be carried out with still better advantage in a closed vessel made expressly for that purpose, so that the pressure of the steam can be raised somewhat above the ordinary atmosphere; but where such a vessel cannot be had the ordinary evaporating-pan will serve as a substitute. I do not wish to confine myself, therefore, to any particular apparatus for carrying out my process; but I reserve the right to use any suitable apparatus in which the same can be carried out.

What I claim as new, and desire to secure by Letters Patent, is—

The within-described process of treating sugar-cane previous to grinding by exposing the same to the action of boiling water or steam, or both combined, substantially as and for the purpose described.

J. C. BELL.

Witnesses:
C. H. GERE,
A. S. STEWART.